United States Patent Office 3,155,688
Patented Nov. 3, 1964

3,155,688
PURIFICATION OF PHTHALIC ANHYDRIDE
Richard William Tomlinson, Manchester, England, assignor to Imperial Chemical Industries Limited, London, England, a corporation of Great Britain
No Drawing. Filed Mar. 17, 1961, Ser. No. 96,361
Claims priority, application Great Britain, May 30, 1960, 19,004/60
5 Claims. (Cl. 260—346.7)

This invention relates to a process for purifying phthalic anhydride.

It has already been proposed to treat the crude phthalic anhydride obtained by air oxidation of naphthalene with condensing agents to render impurities contained by the crude phthalic anhydride less volatile and thereby to facilitate the process of purification by distillation. A large number of condensing agents such as sulphuric acid, zinc chloride and alkali metal hydroxides and carbonates have hitherto been used, generally by adding these agents to the crude phthalic anhydride at temperatures in the region of reflux temperature, that is to say up to about 280° C. One of the most commonly used condensing agents is sodium hydroxide but this agent has certain defects. Thus it is ineffective below 250° C. irrespective of the amount employed, and even above this temperature inconveniently long times of treatment are necessary. For example at about 260° C. a treatment time of about 10 hours is quite usual. We have now found that the potassium phthalate formed when potassium hydroxide or any compound of potassium which is capable of reacting with phthalic anhydride or phthalic acid to form a phthalate is much more soluble in molten phthalic anhydride than te equivalent sodium compound, and that this potassium phthalate is much more effective than the equivalent sodium compound when employed as a condensing agent in phthalic anhydride purification. The use of a potassium phthalate, however formed, enables the heat treatment step of the purification to be carried out more rapidly and at a much lower temperature than has been possible hitherto. For example wtih potassium phthalate at temperatures in the range 220°–240° C. shorter times may be employed than are required with sodium phthalate at 260° C. Even at temperatures in the region of 200° C. the condensation reaction proceeds in presence of potassium phthalate at a high enough rate for a substantial degree of condensation to occur during the preliminary hot storage and heating up prior to final heat treatment. On the large scale heating to working temperature usually takes several hours. Accordingly the ability of the condensation to proceed at low temperatures enables substantial savings in processing time to be made. Furthermore it is possible to curtail the separate heat treatment or condensation step very substantially as condensation can continue during the final distillation step of the purification. This is usually performed at about 220° C. under vacuum. It is of course of great importance in large scale operations to avoid unnecessary processing delays. The present process reduces these delays and has the additional advantages that less heat is required to raise the process charge to working temperature and that there is less corrosion of equipment at the lower temperature.

We have found that the condensation reaction is slowed down and may be inhibited by the presence of oxygen, thus it is a feature of our invention that the treatment with a phthalate of potassium is conducted in the absence of any substantial amount of oxygen, and preferably in an atmosphere of an inert gas such as nitrogen.

According to the present invention we provide an improved process for purifying crude phthalic anhydride obtained by oxidation of naphthalene with oxygen containing gases such as air which comprises heating the crude phthalic anhydride in presence of a phthalate of potassium and in absence of any substantial amount of oxygen at a temperature below 250° C. and thereafter distilling the phthalic anhydride.

The potassium ion may conveniently be added in the form of the hydroxide which is mixed with the crude phthalic anhydride. The mixture is then heated at a convenient temperature up to 250° C. for a time which is determined by the amount of potassium hydroxide added and the quality of the crude phthalic anhydride. For every 100 parts by weight of crude phthalic anhydride up to 1.0 part by weight of potassium hydroxide or its phthalate forming equivalent may be employed, but it is preferred to add from 0.035 to 0.14 part by weight of potassium hydroxide or its phthalate forming equivalent and to heat for periods between 4 hours and 8 hours at a temperature in the range 220° C. to 250° C. Extended periods of treatment at temperatures down to 200° C. or with lower quantities of potassium hydroxide can in certain circumstances be useful. It is usually unnecessary to exceed the addition of about 0.14 part of potassium hydroxide as this corresponds approximately to the limit of solubility of the potassium phthalate over the temperature range 200–250° C. In proportion as the potassium hydroxide addition is increased above 0.14% there is a tendency for deposits of potassium phthalate crystals to form in the reactor and for the production of benzoic acid to increase. It is found that addition of about 1% potassium hydroxide or of its chemical equivalent represents a practical upper working limit.

In place of potassium hydroxide equivalent amounts of the potassium salts of acids weaker than phthalic acid may be employed, for example, potassium carbonate, potassium bicarbonate, and in general any potassium compound which will react with phthalic anhydride or phthalic acid to form potassium phthalate.

The invention is illustrated but not limited by the following examples in which parts and percentages are by weight.

Example 1

0.14 part of potassium hydroxide in the form of a 50% aqueous solution were added to 100 parts of crude phthalic anhydride prepared by the catalytic air oxidation of naphthalene over a vanadium catalyst. The mixture was melted and heated to 230° C. with stirring. The temperature was maintained at 230±3° C. for a period of 4 hours after which the melt was transferred to a still and distilled via a fractionating column at a pressure of 80–100 mm. of mercury. The total distillate of 96.8 parts phthalic anhydride was collected as a water white liquid with a crystallising point of 131.1° C. An atmosphere of nitrogen was maintained above the molten phthalic anhydride throughout the heat treatment and distillation.

Example 2

0.035 part of potassium hydroxide in the form of a 50% aqueous solution were added to 100 parts of crude phthalic anhydride at 180° C. the crude phthalic anhydride being prepared by the catalytic vapour phase air oxidation of naphthalene over a vanadium catalyst and containing 1.2% of α-naphthoquinone and having a total acidity of 98.9% calculated as phthalic anhydride. The mixture was heated with agitation and the temperature raised to 240° C. over 5½ hours, and maintained at 240° C. for a further 5½ hours. The melt was then transferred to a still and distilled via a fractionating column at a pressure of 80–100 mm. of mercury. A forerunnings cut of 5.05 parts was taken for re-treatment, collected in the form of a liquid having a colour of 30 platinum cobalt units on the APHA scale, and a crystallising point of 130.9° C. The more volatile components of the residue of 9.85 parts were stripped in a separate still and received further heat treatment before re-distillation. An atmosphere of nitrogen was maintained above the molten phthalic anhydride throughout the heat treatment and distillation.

*Example 3*

0.07 part of potassium hydroxide in the form of a 50% aqueous solution were added to 100 parts of crude phthalic anhydride prepared by the catalytic vapour phase air oxidation of naphthalene over a vanadium catalyst and containing 2.4% of α-naphthoquinone and having a total acidity of 97.8% calculated as phthalic anhydride, the mixture was melted and heated to 230° C. with agitation. The temperature was maintained at 230±3° C. for 6 hours after which the melt was transferred to a still and distilled via a fractionating column at a pressure of 80–100 mm. of mercury. The total distillate of 90.2 parts of phthalic anhydride was collected in the form of a liquid having a colour of 50 platinum cobalt units on the APHA scale and crystallising point of 131.0° C. An atmosphere of nitrogen was maintained above the molten phthalic anhydride throughout heat treatment and distillation.

*Example 4*

0.07 part of potassium hydroxide in the form of a 50% aqueous solution were added to 100 parts of crude phthalic anhydride prepared by the catalytic vapour phase air oxidation of naphthalene over a vanadium catalyst and containing 1.2% of α-naphthoquinone and having a total acidity of 98.3% calculated as phthalic anhydride. The mixture was melted and the temperature raised to 220° C. with agitation. The temperature was maintained at 220±3° C. for 5 hours after which the mixture was transferred to a still and distilled via a fractionating column at a pressure of 80–100 mm. of mercury. The total distillate of 95.2 parts of phthalic anhydride was collected in the form of a liquid having a colour of 70 platinum cobalt units on the APHA scale and a crystallising point of 131.0° C. An atmosphere of nitrogen was maintained above the molten phthalic anhydride throughout the heat treatment and distillation.

*Example 5*

0.14 part of potassium hydroxide in the form of a 50% aqueous solution were added to 100 parts of crude phthalic anhydride prepared by the catalytic vapour phase air oxidation of naphthalene over a vanadium catalyst and containing 2.4% of α-naphthoquinone and having a total acidity of 97.8% calculated as phthalic anhydride. The mixture was melted and the temperature raised to 200° C. with agitation. The temperature was maintained at 200°±3° C. for 70 hours after which the mixture was transferred to a still and distilled via a fractionating column at a pressure of 80–100 mm. of mercury. The total distillate of 95.2 parts of phthalic anhydride was collected in the form of a liquid having a colour between 10 and 20 platinum cobalt units on the APHA scale and a crystallising point of 131.0° C. An atmosphere of nitrogen was maintained above the molten phthalic anhydride during heat treatment and distillation.

*Example 6*

0.1 part of anhydrous potassium carbonate in the form of a 50% aqueous solution was added to 100 parts of crude phthalic anhydride prepared by the catalytic vapour phase air oxidation of naphthalene over a vanadium catalyst and containing 1.8% of α-naphthoquinone and having a total acidity of 97.9% calculated as phthalic anhydride. The mixture was melted and the temperature raised to 240° C. with agitation. The temperature was maintained at 240±3° C. for 8 hours after which the mixture was transferred to a still and distilled via a fractionating column at a pressure of 80–100 mm. of mercury. The total distillate of 96.4 parts of phthalic anhydride was collected in the form of a liquid having a colour of 10 platinum cobalt units on the APHA scale and a crystallizing point of 131.1° C.

What I claim is:

1. In a process for purifying crude phthalic anhydride obtained by oxidation of naphthalene with oxygen-containing gas wherein said anhydride is treated with a condensing agent at elevated temperatures and thereafter distilled, the improvement which comprises heating the crude phthalic anhydride for from 4 to 8 hours in the presence of a phthalate of potassium at a temperature at least 220° C. and below 250° C.

2. Process according to claim 1 wherein there is added to the crude phthalic anhydride a potassium compound selected from the group consisting of potassium hydroxide and a potassium salt of an acid weaker than phthalic acid, said potassium hydroxide being added in an amount up to 1.0 part by weight of phthalic anhydride and said potassium salt being added in an amount which is a phthalate forming equivalent of said potassium hydroxide.

3. Process according to claim 1 wherein there is added to the crude phthalic anhydride a potassium compound selected from the group consisting of potassium hydroxide and a potassium salt of an acid weaker than phthalic acid, said potassium hydroxide being added in an amount of from 0.035 to 0.14 part by weight of phthalic anhydride and said potassium salt being added in an amount which is a phthalate forming equivalent of said potassium hydroxide.

4. Process according to claim 1 wherein the crude phthalic anhydride and phthalate of potassium are heated in an inert atmosphere.

5. Process according to claim 4 wherein the inert atmosphere is nitrogen.

References Cited in the file of this patent
UNITED STATES PATENTS

| | | |
|---|---|---|
| 1,728,225 | Bowers | Sept. 17, 1929 |
| 2,670,325 | West et al. | Feb. 23, 1954 |
| 2,919,273 | Schutt et al. | Dec. 29, 1959 |